United States Patent
Miao et al.

(10) Patent No.: US 12,405,957 B2
(45) Date of Patent: Sep. 2, 2025

(54) CARDINALITY ESTIMATION METHOD AND DEVICE FOR SKYLINE QUERY BASED ON DEEP LEARNING

(71) Applicant: ZHEJIANG UNIVERSITY, Zhejiang (CN)

(72) Inventors: Xiaoye Miao, Zhejiang (CN); Jiazhen Peng, Zhejiang (CN); Yangyang Wu, Zhejiang (CN); Jianwei Yin, Zhejiang (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 84 days.

(21) Appl. No.: 18/382,044

(22) Filed: Oct. 19, 2023

(65) Prior Publication Data

US 2024/0045871 A1  Feb. 8, 2024

Related U.S. Application Data

(63) Continuation of application No. PCT/CN2023/080962, filed on Mar. 13, 2023.

(30) Foreign Application Priority Data

Jul. 26, 2022  (CN) .................. 202210884022.3

(51) Int. Cl.
*G06F 30/00* (2020.01)
*G06F 16/2453* (2019.01)
*G06F 16/2455* (2019.01)

(52) U.S. Cl.
CPC .. *G06F 16/24553* (2019.01); *G06F 16/24542* (2019.01)

(58) Field of Classification Search
None
See application file for complete search history.

(56) References Cited

U.S. PATENT DOCUMENTS 12,189,629 B2 * 1/2025 Sen ................... G06F 9/505

OTHER PUBLICATIONS

Yang Zongheng, Deep Unsupervised Cardinality Estimation. Nov. 2019. Proceedings of the VLDB Endowment.*

(Continued)

*Primary Examiner* — Tuankhanh D Phan

(57) ABSTRACT

A cardinality estimation method for Skyline query based on deep learning comprises: parsing historical query log information of a database to obtain Skyline query on a given target dataset and its corresponding cardinality to construct a training set; constructing and training respective data distribution learning models according to distribution information of the target dataset and the training set; using model parameters of the trained data distribution learning models as initialization parameter of the cardinality estimation model, and training the cardinality estimation model according to the training set; inputting query points to obtain final cardinality estimates according to the trained cardinality estimation model. The present disclosure provides a solution for cardinality estimation for Skyline query variants, and ensures the monotonic nature of cardinality estimation for Skyline query variants, and proposes an efficient and accurate cardinality estimation method.

8 Claims, 2 Drawing Sheets

(56) References Cited

OTHER PUBLICATIONS

Zongheng Yang et al, "Deep Unsupervised Cardinality Estimation" Proceedings of the VLDB Endowment, Nov. 1, 2019, ISSN: 2150-8097, pp. 279-292.
Zhenjie Zhang et al,"Kernel-Based Skyline Cardinality Estimation" Proceedings of the 2009 ACM SIGMOD International Conference on Management of data,Jun. 29, 2009,pp. 509-521.
International Search Report and Written Opinion Dated May 19, 2023 for corresponding PCT Application No. PCT/CN2023/080962 (Chinese and English).

\* cited by examiner

CARDINALITY ESTIMATION METHOD AND DEVICE FOR SKYLINE QUERY BASED ON DEEP LEARNING

CROSS-REFERENCE TO RELATED APPLICATIONS

The present application is a Continuation Application of PCT Application No. PCT/CN2023/080962, filed on Mar. 13, 2023, which claims the priority of Chinese Application No. 202210884022.3, filed on Jul. 26, 2022, the entire contents of which are hereby incorporated by reference.

TECHNICAL FIELD

The present application relates to the field of information retrieval technology, especially to a cardinality estimation method and a device for Skyline query based on deep learning.

DESCRIPTION OF THE PRIOR ART

Skyline query is a typical multi-objective optimization problem, which can return the optimal set of data according to the querier's preference, and which is one of the classic queries of databases. Skyline query is widely used in multi-objective decision problems, such as customer information services, recommendation systems, decision support and decision systems, etc., which has high practical significance and research value. In recent years, a variety of Skyline query variants have been proposed, such as dynamic Skyline query, reverse Skyline query, k-dominant Skyline query, k-Skyband query, ε-Skyline query, etc., which greatly enriches the connotation of traditional Skyline query and expands the application scenarios of Skyline query.

When these Skyline operations are integrated into a database management system, the cardinality estimation problem of the Skyline query is involved. This problem is very important because the query optimizer is an integral part of the database management system, and accurate and efficient cardinality estimation is critical to query optimization. Query optimization requires estimating the scale of intermediate results (i.e., cardinality estimation) in order to propose the best execution plan. When an execution plan is based on an incorrect cardinality estimation, it will be several orders of magnitude times slower than the optimal plan. And when cardinality estimation itself is not efficient enough, query optimization loses its meaning.

At present, there are some statistical methods for Skyline query cardinality estimation problems, such as sampling-based, kernel-based, histogram-based methods, etc. However, these efforts have limitations: (1) these cardinality estimation methods for Skyline query still give sub-optimal solutions; (2) These traditional methods need to perform the entire estimation process for each query object, which is very time-consuming when the number of queries is large; (3) These methods are not well supported for Skyline query variants, especially for reverse Skyline queries, and there is currently a lack of a general scheme to solve the cardinality estimation problem of these Skyline query variants.

SUMMARY OF THE DISCLOSURE

An object of the present application is to provide a cardinality estimation method and a device for Skyline query based on deep learning, so as to solve the problem that the traditional cardinality estimation methods are difficult to estimate the cardinality of Skyline queries quickly and accurately.

According to a first aspect of embodiments of the present application, a cardinality estimation method for Skyline query based on deep learning is provided. The method comprises:
  obtaining the Skyline query on a target dataset and the corresponding cardinality by screening and parsing from the historical query log information of a database;
  constructing a training set based on the Skyline query and the corresponding cardinality;
  constructing and training respective data distribution learning models according to distribution information of the target dataset and the training set;
  constructing a cardinality estimation model, and using model parameters of the trained data distribution learning model as initialization parameters of the cardinality estimation model to train the cardinality estimation model through the training set; and
  inputting query points to obtain final cardinality estimates according to the trained cardinality estimation model.

Further, the Skyline query is a dynamic Skyline query, a reverse Skyline query, a dynamic k-Dominant Skyline query, a dynamic k-Skyband query or a dynamic ε-Skyline query.

Further, the step of obtaining the Skyline query on a target dataset and the corresponding cardinality by screening and parsing from the historical query log information of a database comprises:
  parsing and screening out the Skyline query on the target dataset and the corresponding cardinality from a query statement of the historical query log information, wherein the Skyline query comprises query points and query parameters; and
  parsing a size of a query result set, that is, the query cardinality from query results of the Skyline query.

Further, the constructing and training of the data distribution learning model comprises:
  constructing a deep self-attention transformation network;
  masking randomly a certain proportion of value to obtain the masked data after sampling and encoding the target dataset or training set; and
  inputting the masked data into the deep self-attention transformation network for training to obtain the data distribution learning model, wherein the task of model training is to predict these masked values, and the goal of model optimization is to maximize conditional likelihood probability of the masked values.

Further, the constructing and training of the cardinality estimation model comprises:
  1) constructing a cardinality estimation sub model $M_Q$ based on query points, wherein the cardinality estimation sub model $M_Q$ has a first deep neural network composed of Transformer, pooling layer and linear connection layer, and initial parameter is a parameter of the trained data distribution learning model on the target dataset;
  2) constructing a cardinality estimation sub model $M_P$ based on query parameters, wherein the cardinality estimation sub model $M_P$ has a second deep neural network composed of Transformer, pooling layer and linear connection layer, and initial parameters are parameters of the trained data distribution learning model on the training set; and
  3) encoding the query points and inputting the encoded data into the first deep neural network for training to obtain the cardinality estimation sub model $M_Q$, and splicing and encoding the query points and the query parameters and inputting the encoded data into the second deep neural network for training to obtain the cardinality estimation sub model $M_P$ based on query parameters, wherein the cardinality estimation sub model $M_P$ based on query parameters always keeps the model parameters positive during the training, and the goal of the model optimization is to minimize an error between an weighted average of outputs of the two cardinality estimation sub models and the true cardinality value.

Further, the step of entering query points to obtain final cardinality estimates according to the trained cardinality estimation model comprises:

parsing out the query points and the query parameters from the query statement, and inputting to, after encoding, the trained cardinality estimation model, and obtaining the final cardinality estimates by denormalization of the model outputs.

According to a second aspect of embodiments of the present application, a cardinality estimation device for Skyline query based on deep learning is provided. The device comprises:

a parsing and screening module configured for obtaining the Skyline query on a target dataset and the corresponding cardinality by screening and parsing from the historical query log information of a database;

a first constructing module configured for constructing a training set based on the Skyline query and the corresponding cardinality;

a first constructing and training module configured for constructing and training respective data distribution learning models according to distribution information of the target dataset and the training set;

a first constructing and training module configured for constructing a cardinality estimation model, and using model parameters of the trained data distribution learning model as initialization parameter of the cardinality estimation model to train the cardinality estimation model through the training set; and a query estimation module configured for inputting query points to obtain final cardinality estimates according to the trained cardinality estimation model.

According to a second aspect of embodiments of the present application, an electronic equipment is provided. The equipment comprises:

one or more processors; and a memory, configured to store one or more programs;

when the one or more programs are executed by the one or more processors such that the one or more processors implement the method of the first aspect.

According to a fourth aspect of the present application, a computer-readable storage medium on which computer instructions are stored is provided, wherein when the instructions are executed by a processor, the steps of the method of the first aspect are implemented.

The technical solutions provided by the embodiments of the present application may include the following beneficial effects:

It can be seen from the above embodiments that the present application uses deep learning-based method to perform cardinality estimation for Skyline queries, therefore the problems of low estimation accuracy and slow estimation caused by experience in traditional methods, and then achieves the effect of improving efficiency, accuracy, robustness, and scalability in all aspects. By means of the method of learning the data distribution of the target dataset and the training set through the data distribution learning model, the influence of the Skyline query results of the data distribution is overcome, and then the accuracy of the model is enhanced, so that the method can support various data distributions.

The model designed in the present application is applicable to almost all Skyline query variants, and provides a solution to the cardinality estimation problem of these Skyline query variants.

It should be understood that the above general description and the following detailed description are only exemplary and explanatory and do not limit the present application.

BRIEF DESCRIPTION OF DRAWINGS

The drawings herein are incorporated into the specification and form part of the present specification, which illustrates embodiments conforming to the present application, and is used to explain the principles of the present application together with the description.

DESCRIPTION OF EMBODIMENTS

The Exemplary embodiments will be described in detail herein.

Embodiment 1

Figure 1:
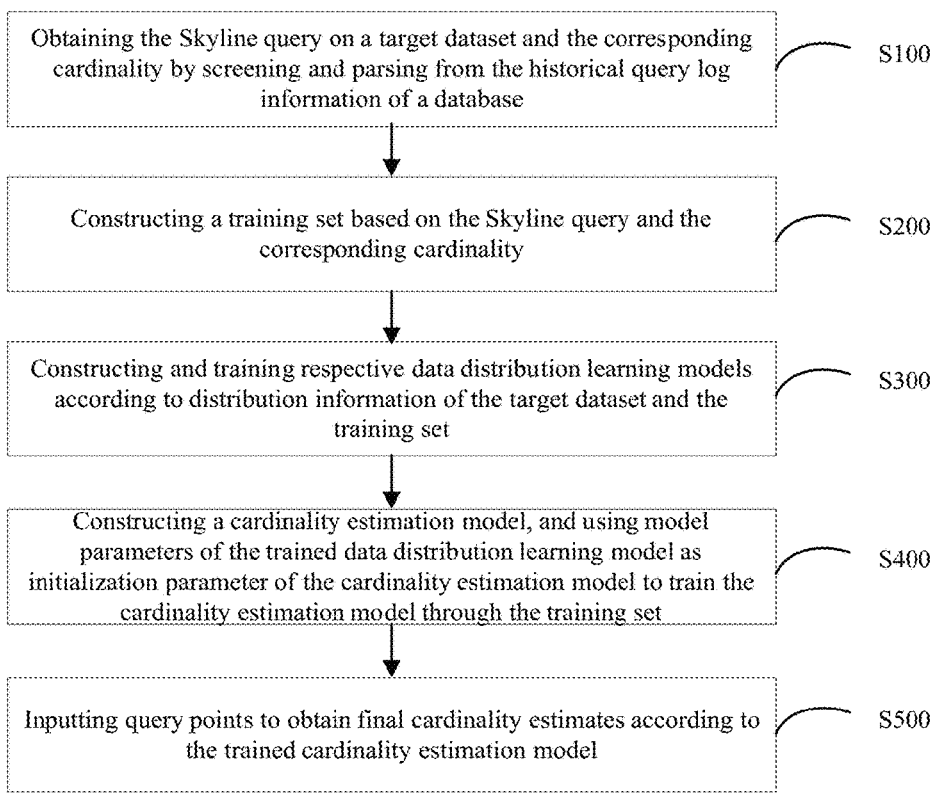
FIG. 1 is a flow chart of the cardinality estimation method for Skyline query based on deep learning according to the present disclosure.
Figure 2:
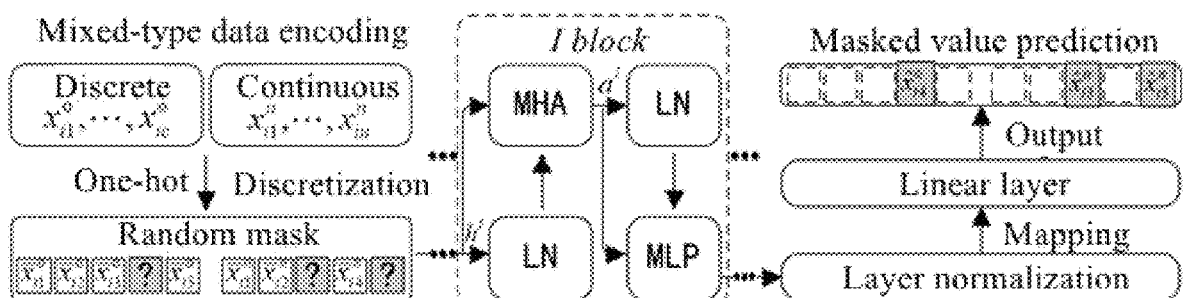
FIG. 2 is a block diagram of the data distribution learning model according to the present disclosure.
Figure 3:
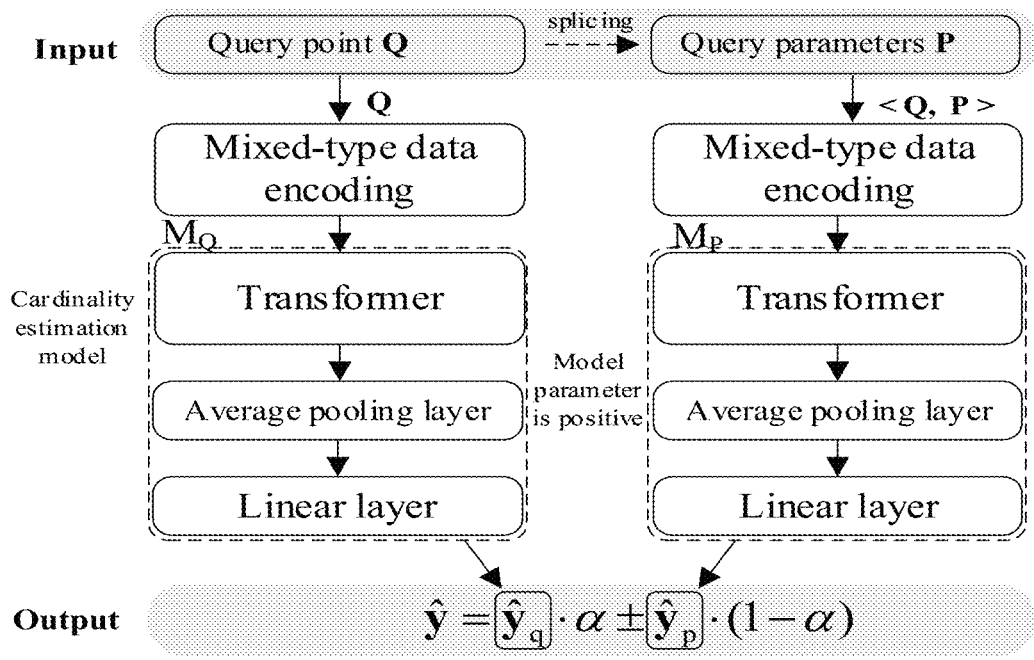
FIG. 3 is a block diagram of the cardinality estimation model according to the present disclosure.

FIG. 1 is a flow chart of the cardinality estimation method for Skyline query based on deep learning according to the present disclosure. FIG. 2 is a block diagram of the data distribution learning model according to the present disclosure. FIG. 3 is a block diagram of the cardinality estimation model according to the present disclosure. The method comprises the following steps.

Step S100: Obtaining the Skyline query on a target dataset and the corresponding cardinality by screening and parsing from the historical query log information of a database, specifically comprising the following steps:

Step S101: Parsing and screening out the Skyline query on the target dataset and the corresponding cardinality from a query statement of the historical query log information, wherein the Skyline query comprises query points and query parameters.

Specifically, to determine the target dataset D and a Skyline query to be performed, such as using a dynamic k-dominant Skyline query as an example herein. Where the dimension of the target dataset D is d. To parse the database history query log information, and extract the target dataset D for performing the dynamic k-Dominant Skyline query operation, the query point Q of the dynamic k-Dominant Skyline query and its query parameters P from the query statement.

Step S102: Parsing a scale of a query result set, that is, the query cardinality from query results of the Skyline query.

Specifically, to parse a scale of a query result set, i.e., the query cardinality C from query results of the dynamic k-Dominant Skyline query.

Step S200: Constructing a training set based on the Skyline query and the corresponding cardinality, specifically comprising the following steps:

Step S201: Forming the query point Q, query parameters P, and query cardinality C in the dynamic k-Dominant Skyline query extracted in step S102 into a several of <Q, P, C> triples. If there is no corresponding query parameters, such as dynamic Skyline query and reverse Skyline query, P is denoted as 0.

Step S202: If there are not enough <Q, P, C> triples extracted from the database history query log, additional triples need to be generated. That is, several query points Q are uniformly generated within the range of the target dataset D, and then query parameters P are randomly assigned according to the uniform distribution. The dynamic k-Dominant Skyline query is executed according to the generated Q and P, and the results are obtained. Thereby, a result set scale C is obtained, and a batch of new triples is generated. All generated triples serve as the training set.

Step S300: Constructing and training respective data distribution learning models according to distribution information of the target dataset and the training set.

Step S301: The processing process of the model input step is described as follows:

Step S30101: Performing simple random sampling of the target dataset according to a certain proportion. The recommended sampling rate here is 6%, which can balance efficiency and accuracy. Assume there are s pieces of data after sampling. The present application uses a sampling technique; hence it overcomes the problem that the scale of the dataset is too large and the model training efficiency is too low, and then the method can support a larger dataset.

Step S30102: Assuming that the d dimension of database D contains c discrete variables and u continuous variables. It is necessary to firstly transform the u continuous variables into discrete variables using the equidistance discretization method. For example, the i-th variable $X_i$ in the database is a continuous variable. Then $X_i$ is divided into β buckets with equal width. Assume the range of $X_i$ is $[x_i^{min}, x_i^{max}]$, then the interval width is defined as: $w_i=(x_i^{max}-x_i^{min})/\beta$. Then the discretized result of $\bar{x}_i$ of $x_i$ can be obtained by the discretization function $d_i^{EDD}(\cdot)$. Namely $\bar{x}_i=d_i^{EDD}(x_i)=floor((x_i-x_i^{min})/w_i)$. Where floor(·) is the round-down function. After transforming all continuous data into discrete data in the above way, all discrete data is encoded by one-hot encoding. Assume that the number of discretized different values of the data of the i-th dimension is $n_i$, the length of the code for each dimension is $n_i$, and the total length of each piece of data code is $$\sum_{i=1}^{d} n_i,$$

denoted as n. That is, the original matrix size is s×d, and the encoded matrix size is $$s \times \sum_{i=1}^{d} n_i,$$

i.e. s×n, this encoded matrix is denoted as x. The present application uses the equidistant discretization method to transform continuous data into discrete data, hence it overcomes the technical problem that the model input cannot support continuous data, and then achieves the effect that the method can support more data types.

Step S30103: Generating a mask matrix M with scale of s×d, wherein the value of the mask is 0 or 1. Where $M_{ij}=1$ means that the j-th dimension of the i-th piece of data is masked and needs to be predicted; Otherwise, there is no need to mask and predict. The recommended mask rate here is 15%. Then the mask matrix M with scale s×d is then transformed to a mask matrix M' with scale s×n, where if $M_{ij}=1$, then $$\left[M'_{i\left(\sum_{k=1}^{j-1} n_k+1\right)}, \ldots, M'_{i\sum_{k=1}^{j} n_k}\right] = [1, \ldots, 1],$$

and the rest is 0. According to the mask matrix M', codes need to be masked in x are masked with 0, which is denoted as x', where the masked value will be used as a label to guide the training of the model.

Step S302: Constructing and training a data distribution learning model with model structure being shown in FIG. 2. The specific process is described as follows:

Step S30201: According to the model structure shown in FIG. 2, building the model, i.e., 1 Transformer modules followed by a layer normalization module and a linear layer.

Step S30202: Inputting the matrix x' btained in step S30103 into the model, with the model output of a matrix with a scale s×n, which is the probability of each value in the sampling of the prediction target dataset, denoted as p. Then the cross-entropy loss function with a mask is used for the loss function $Loss_{pre}$, and the loss function of the i-th sample is:

$$Loss_{pre}^i(x_i, p_i, M'_i) = -E\left[\sum_{j=1}^{n} x_{ij} \log(p_{ij}) \cdot M'_{ij}\right] \quad (1)$$

Then the loss function for all samples is:

$$Loss_{pre} = E\left[\sum_{i=1}^{s} Loss_{pre}^i\right] \quad (2)$$

Step S30203: The data distribution learning model is batch trained by minimizing its loss function $Loss_{pre}$, and the training stops till the model training reaches the maximum number of model iterations, so as to obtain the optimal model parameter $M_D$.

Step S303: Constructing and training a data distribution learning model $M_{Q-P}$ on the training set according to Steps S301 and S302, and change the input target dataset of the model in the steps to the <Q, P> of the training set, and no sampling is required on the training set, so as to obtain the $M_{Q-P}$ of the optimal model parameter.

Step S400: Constructing and training a cardinality estimation model, specifically comprising the following steps:

Step S401: Constructing a cardinality estimation sub model $M_Q$ based on query point. This specifically comprises the following steps:

Step S40101: Performing one-hot encoding of Q of the training set according to the method of Steps S30102 as the input of the model. Assuming the scale of the training set Q is $n_q \times d$, and the scale of the encoded training set is $$n_q \times \sum_{i=1}^{d} n_i,$$

i.e., $n_q \times n$.

Step S40102: Constructing a cardinality estimation sub model $M_Q$ based on query point according to the model structure of FIG. 3, that is, a Transformer module plus an average pooling layer and a linear layer. The parameter of the Transformer module is initialized to the parameter of the Transformer module of the data distribution learning model cardinality $M_D$ on the target dataset.

Step S40103: The input of the cardinality estimation sub model $M_Q$ based on query point is $\hat{y}_q$ with a scale of $n_q \times 1$.

Step S402: Constructing a cardinality estimation sub model $M_P$ based on query point. This comprises the following steps:

Step S40201: Performing one-hot encoding of <Q, P> of the training set according to the method of Steps S30102 as the input of the model. Assuming that the scale of the training set <Q, P> is $n_q \times (d+1)$, and the number of different query parameters P is $n_p$, the scale after encoding is $$n_q \times \left( \sum_{i=1}^{d} n_i + n_p \right),$$

i.e., $n_q \times (n+n_p)$.

Step S40202: Constructing a cardinality estimation sub model $M_P$ based on query parameters according to the model structure of FIG. 3, that is, a Transformer module plus an average pooling layer and a linear layer. The parameter of the Transformer module is initialized to the parameter of the Transformer module of the data distribution learning model cardinality $M_{Q-P}$ on the training set.

Step S40203: The input of the cardinality estimation sub model $M_P$ based on query parameters is $\hat{y}_p$ with a scale of $n_q \times 1$.

Step S40204: Note that when performing model training in Step S405, performing clamping operation on the parameters of the cardinality estimation sub model $M_P$ based on query parameters, as shown in FIG. 3, i.e., keeping its parameter positive, so as to ensure that $\hat{y}_p$ increases with the increase of the query parameters P. In the present application, the model parameters of the cardinality estimation sub model $M_P$ based on query parameters are guaranteed to be all positive, therefore the monotonic nature of the query cardinality changing with the change of query parameters is ensured, thereby improving the accuracy and interpretability of the method.

Step S403: The final cardinality estimate is obtained by weighted averaging the outputs of the two cardinality estimation sub models, that is, the model output $\hat{y}_q$ and $\hat{y}_p$ obtained in Step S40103 and Step S40203, with a scale of $n_q \times 1$. i.e., $$\hat{y} = \alpha \cdot \hat{y}_q \pm (1-\alpha) \cdot \hat{y}_p \qquad (3)$$

The recommended value of $\alpha$ in equation (3) is 0.8. When the query operation is a dynamic k-dominant skyline query or a dynamic k-Skyland query, the cardinality C increases with the increase of the query parameters P, and in this case the sign in equation (3) is "+"; When the query operation is a dynamic ε-Skyline query, the cardinality C decreases with the increase of the query parameters P, and in this case the symbol in equation (3) is "−".

Step S404: The results $\hat{y}$ obtained by the cardinality estimation model are normalized with the cardinality real values C in the training set, so as to be used as input to the mean squared error loss function to guide the optimization of model parameters. That is, the cardinal real value C is normalized to [0,1] by the function MaxMinScaler(·), denoted as y, then the loss function Loss is:

$$\text{Loss}(y, \hat{y}) = MSE(y, \hat{y}) = \frac{1}{n_q} \sum_{i=1}^{n_q} (y_i - \hat{y}_i)^2 \qquad (4)$$

where the function MaxScaler(·) X is to normalize a vector X to $X_{std}$, with a range of [0,1], and the specific formula is:

$$X_{std} = MinMaxScaler(X) = \frac{X - X^{min}}{X^{max} - X^{min}} \qquad (5)$$

Where $X^{min}$ and $X^{max}$ are the minimum and maximum values of the vector X, respectively. The reason that the normalized value of the predicted cardinality real value rather than directly predicting the real value of the cardinality is used in the present application, is that the cardinality changes in a large range, especially the cardinality of the Skyline query variant. Therefore, after normalizing the cardinality, uniform orders of magnitude can make the model converge faster and more accurately.

Step S405: The cardinality prediction model is batch trained by minimizing its loss Loss, and the training stops till the model training reaches the maximum number of model iterations or the loss on the validation set is no longer down for 3 consecutive iterations, so as to obtain the optimal model parameter.

Step S500: Inputting query points to obtain final cardinality estimates according to the trained cardinality estimation model, specifically comprising the following steps:

Step S501: Parsing the input dynamic k-Dominant Skyline query statement, and extracting the query points Q and query parameters P.

Step S502: Performing one-hot encoding of Q and <Q, P> in the training set respectively according to the method of Steps S30102 as the input of two query estimation sub models.

Step S503: Inputting the result of Step S502 into the trained query estimation model in Step S405, to obtain ŷ.

Step S504: Denormalizing ŷ obtained in step S503 by means of a function InverseTrans(·) to obtain the final estimated cardinality C'. Where the function InverseTrans(·) is an operation that normalizes a vector X to $X_{std}$ by means of the function MaxMinScaler(·) and then denormalizes it to X. The specific formula is:

$$X=\text{InverseTrans}(X_{std})=X_{std}\times(X^{max}-X^{min})+X^{min} \qquad (6)$$

Where $X^{min}$ and $X^{max}$ of equation (6) has the same meaning and value as $X^{min}$ and $X^{max}$ in equation (5).

Step S505: The cardinality estimate C obtained in Step S504 is the cardinality estimate of the query.

The present disclosure also provides an embodiment of a cardinality estimation device for Skyline query based on deep learning. Since the cardinality estimation device for Skyline query provided by the present disclosure corresponds to an embodiment of the cardinality estimation method for Skyline query, the Skyline query cardinality estimation device may achieve the object of the present disclosure by performing the process steps in the embodiment of the above method. Therefore, the explanation in the embodiment of the cardinality estimation method for Skyline query based on deep learning, also applicable to the embodiment of the cardinality estimation device for Skyline query based on deep learning provided by the present disclosure, will not be repeated in the following embodiments of the present disclosure.

Figure 4:
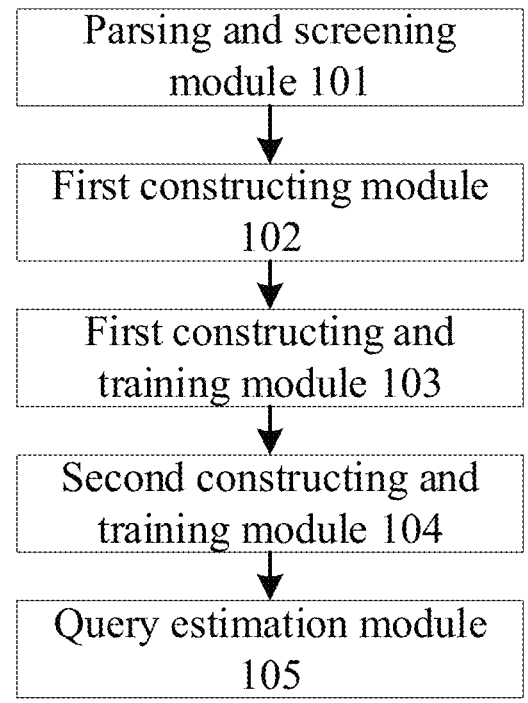
FIG. 4 is a block diagram of the cardinality estimation device for Skyline query based on deep learning according to the present disclosure.

As shown in FIG. 4, the present disclosure also provides a cardinality estimation device for Skyline query based on deep learning according to the present disclosure, comprising:

a parsing and screening module 101 configured for obtaining the Skyline query on a target dataset and the corresponding cardinality by screening and parsing from the historical query log information of a database;

a first constructing module 102 configured for constructing a training set based on the Skyline query and the corresponding cardinality;

a first constructing and training module 103 configured for constructing and training respective data distribution learning models according to distribution information of the target dataset and the training set;

a second constructing and training module 104 configured for constructing a cardinality estimation model 104, and using model parameters of the trained data distribution learning model as initialization parameter of the cardinality estimation model to train the cardinality estimation model through the training set; and a query estimation module 105 configured for inputting query points to obtain final cardinality estimates according to the trained cardinality estimation model.

With respect to the device in the above embodiment, wherein the specific way each module performs operations has been described in detail in the embodiment of the relevant method, which will not be described in detail herein.

For device embodiments, because it basically corresponds to a method embodiment, the relevant points refer to the partial description of the method embodiment. The device embodiments described above are illustrative only, wherein the unit described as a separate component may or may not be physically separated, the component displayed as a unit may or may not be a physical unit, i.e., may be in one place, or may also be distributed on a plurality of network units.

Some or all the modules can be selected according to actual needs to achieve the purpose of this application scheme. Those of ordinary skill in the art can understand and implement it without creative labor.

Accordingly, the present application also provides an electronic equipment, comprising: one or more processors; memory, which stores one or more programs; When the program or programs are executed by one or more processors, such that the processor or processors implement a Skyline query cardinality estimation method based on deep learning as described above.

According to a fourth aspect of the present application, a computer-readable storage medium on which computer instructions are stored is provided, wherein when the instructions are executed by a processor, the steps of the method of the first aspect are implemented.

It should be understood that the present application is not limited to the precise structure described above and shown in the drawings, and may be modified and altered without departing from its scope. The scope of this application is limited only by the attached claims.

The invention claimed is:

1. A cardinality estimation method for Skyline query based on deep learning, comprising:

obtaining the Skyline query on a target dataset and a corresponding cardinality by screening and parsing from historical query log information of a database;

constructing a training set based on the Skyline query and the corresponding cardinality;

constructing and training respective data distribution learning models according to distribution information of the target dataset and the training set;

constructing a cardinality estimation model, and using model parameters of trained data distribution learning models as initialization parameters of the cardinality estimation model to train the cardinality estimation model through the training set; and inputting query points to obtain final cardinality estimates according to a trained cardinality estimation model, wherein the step of obtaining the Skyline query on a target dataset and a corresponding cardinality by screening and parsing from historical query log information of a database comprises:

parsing and screening out the Skyline query on the target dataset and the corresponding cardinality from a query statement of the historical query log information, wherein the Skyline query comprises the query points and query parameters; and parsing a scale of a query result set, that is, a query cardinality from query results of the Skyline query, wherein constructing and training of the cardinality estimation model comprises:

1) constructing a cardinality estimation sub model MQ based on the query points, wherein the cardinality estimation sub model MQ has a first deep neural network composed of a Transformer, a pooling layer and a linear connection layer, and an initial parameter is a parameter of a trained data distribution learning model on the target dataset;

2) constructing a cardinality estimation sub model MP based on the query parameters, wherein the cardinality estimation sub model MP has a second deep neural network composed of a Transformer, a pooling layer and a linear connection layer, and an initial parameter is a parameter of a trained data distribution learning model on the training set; and 3) encoding the query points and inputting encoded data into the first deep neural network for training to obtain the cardinality estimation sub model MQ, and splicing and encoding the query points and the query parameters and inputting encoded data into the second deep neural network for training to obtain the cardinality estimation sub model MP based on the query parameters, wherein the cardinality estimation sub model MP based on the query parameters always keeps the model parameters positive during training, and a goal of model optimization is to minimize an error between an weighted average of outputs of the two cardinality estimation sub models MP, MQ and a true cardinality value.

2. The method according to claim 1, wherein the Skyline query is a dynamic Skyline query, a reverse Skyline query, a dynamic k-Dominant Skyline query, a dynamic k-Skyband query or a dynamic ε-Skyline query.

3. The method according to claim 1, wherein constructing and training of the data distribution learning model comprises:

constructing a deep self-attention transformation network;

masking randomly a certain proportion of value to obtain masked data after sampling and encoding the target dataset or training set; and inputting the masked data into the deep self-attention transformation network for training to obtain the data distribution learning model, wherein a task of model training is to predict masked values, and the goal of the model optimization is to maximize conditional likelihood probability of the masked values.

4. The method according to claim 1, wherein the step of inputting query points to obtain final cardinality estimates according to a trained cardinality estimation model comprises:

parsing out the query points and the query parameters from the query statement, and inputting to, after encoding, the trained cardinality estimation model, and obtaining the final cardinality estimates by denormalization of model outputs.

5. A electronic equipment, comprising:

one or more processors; and a memory, configured to store one or more programs;

when the one or more programs are executed by the one or more processors such that the one or more processors implement the method of claim 1.

6. A electronic equipment, comprising:

one or more processors; and a memory, configured to store one or more programs;

when the one or more programs are executed by the one or more processors such that the one or more processors implement the method of claim 2.

7. A electronic equipment, comprising:

one or more processors; and a memory, configured to store one or more programs;

when the one or more programs are executed by the one or more processors such that the one or more processors implement the method of claim 3.

8. A electronic equipment, comprising:

one or more processors; and a memory, configured to store one or more programs;

when the one or more programs are executed by the one or more processors such that the one or more processors implement the method of claim 4.

* * * * *